(12) United States Patent
Ardila Duarte et al.

(10) Patent No.: US 9,073,090 B2
(45) Date of Patent: Jul. 7, 2015

(54) VIBRO-ELASTIC HELICAL CONIC APRONS IMPLEMENTED IN DE-PULPING MACHINES FOR THE SELECTIVE PROCESSING OF MIXTURES OF GREEN AND RIPE COFFEE CHERRIES

(75) Inventors: Alvaro Ardila Duarte, Bucaramanga (CO); Elías Ariza Villamil, Bucaramanga (CO)

(73) Assignees: PENAGOS HERMANOS Y CIA LTDA., Bucaramanga (CO); Alvaro Ardila Duarte, Bucaramanga (CO)

( * ) Notice: Subject to any disclaimer, the term of this patent is extended or adjusted under 35 U.S.C. 154(b) by 615 days.

(21) Appl. No.: 13/126,143

(22) PCT Filed: Dec. 7, 2009

(86) PCT No.: PCT/IB2009/055555
§ 371 (c)(1),
(2), (4) Date: Jul. 15, 2011

(87) PCT Pub. No.: WO2010/073163
PCT Pub. Date: Jul. 1, 2012

(65) Prior Publication Data
US 2011/0262607 A1    Oct. 27, 2011

(30) Foreign Application Priority Data
Dec. 22, 2008    (BR) ..................... 0806014

(51) Int. Cl.
*A23N 5/00*    (2006.01)
*A47J 43/00*    (2006.01)
(Continued)

(52) U.S. Cl.
CPC ................. *B07B 13/003* (2013.01); *A23F 5/02* (2013.01); *A23N 5/08* (2013.01)

(58) Field of Classification Search
CPC .... A23N 2015/008; A23N 15/00; B07B 1/00; B07B 13/003
USPC ................... 99/568, 574, 584, 569, 601, 609
See application file for complete search history.

(56) References Cited

U.S. PATENT DOCUMENTS 232,714 A    9/1880 Henington
2,282,718 A *  5/1942 Fujioka ........................ 99/609
(Continued)

FOREIGN PATENT DOCUMENTS

AU    66995/90    3/1991
DE    320158    4/1920
(Continued)

OTHER PUBLICATIONS

Machine Translation of Vasilev et al. RU 2077384 (Apr. 1997).*
(Continued)

*Primary Examiner* — Michele L Jacobson
*Assistant Examiner* — Tynesha McClain-Coleman
(74) *Attorney, Agent, or Firm* — Merchant & Gould P.C.

(57) ABSTRACT

The present invention belongs to the field of mechanics and refers to a device for selective processing of mixtures of green and ripe coffee cherries. Said device is a helical conic apron comprising vibro-elastic inserts which pliability allow them displace proportionally to the size and hardness of different coffee cherries. Additionally, the present invention refers to an integral machine comprising helical conic aprons with vibro-elastic inserts, which does not use water and is designed to receive mixtures of ripe and green coffee cherries, depulp ripe cherries, separate semi-pulped green cherries by a separating machine and remove the pulp from ripe cherries. Finally, the present invention refers to a method for the selective processing of mixtures of green and ripe coffee cherries by the use of the already mentioned integral machine.

9 Claims, 9 Drawing Sheets

General and cross-sectional view of the vertical conic depulping machine with vibro-elastic helical conic aprons

(51) Int. Cl.
*B07B 1/00* (2006.01)
*B07B 13/00* (2006.01)
*B07B 15/00* (2006.01)
*A23F 5/02* (2006.01)
*A23N 5/08* (2006.01)

(56) References Cited

U.S. PATENT DOCUMENTS

| | | | | |
|---|---|---|---|---|
| 2,790,573 A | * | 4/1957 | Warren | 217/122 |
| 3,139,919 A | | 7/1964 | Rivera | |
| 4,196,224 A | * | 4/1980 | Falk | 426/483 |
| 4,658,712 A | | 4/1987 | Spencer | |

FOREIGN PATENT DOCUMENTS

| | | |
|---|---|---|
| GB | 18050 | 7/1914 |
| RU | 2077384 C1 * | 4/1997 |

OTHER PUBLICATIONS

Form PCT/ISA/237 for corresponding International Application No. PCT/IB2009/055555.

Form PCT/IB/373 for corresponding International Application No. PCT/IB2009/055555.

\* cited by examiner

Figure 1a. Picture of a vibro-elastic helical conic apron
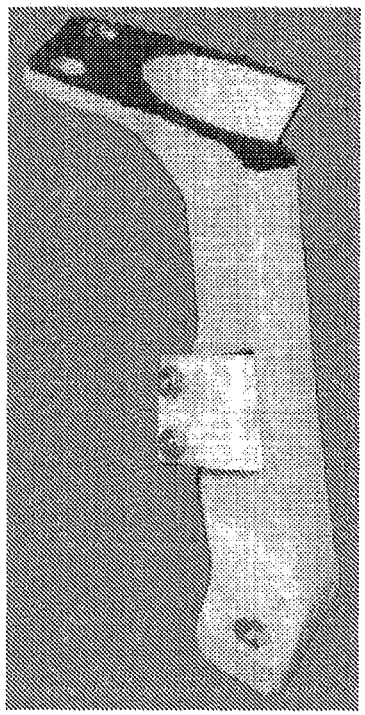
Figure 1b. Picture of an individual elastic insert
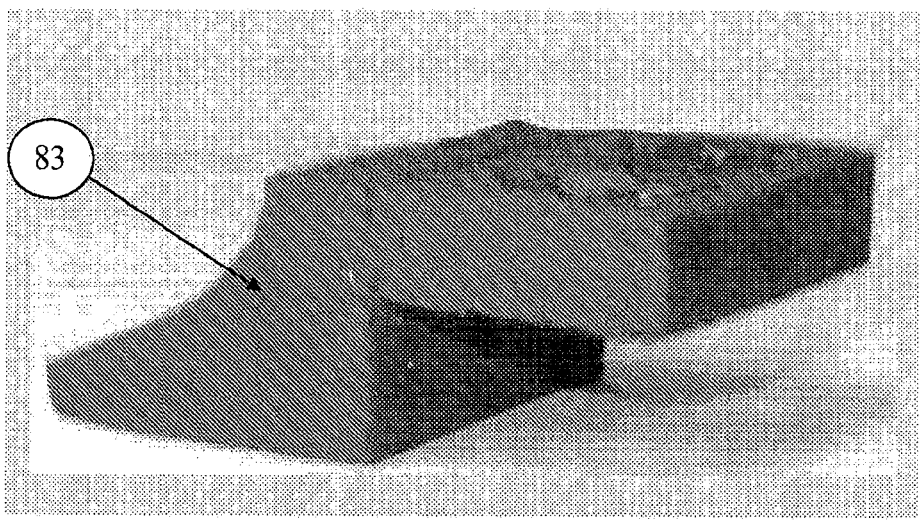

Figure 1c. Picture of the apron body
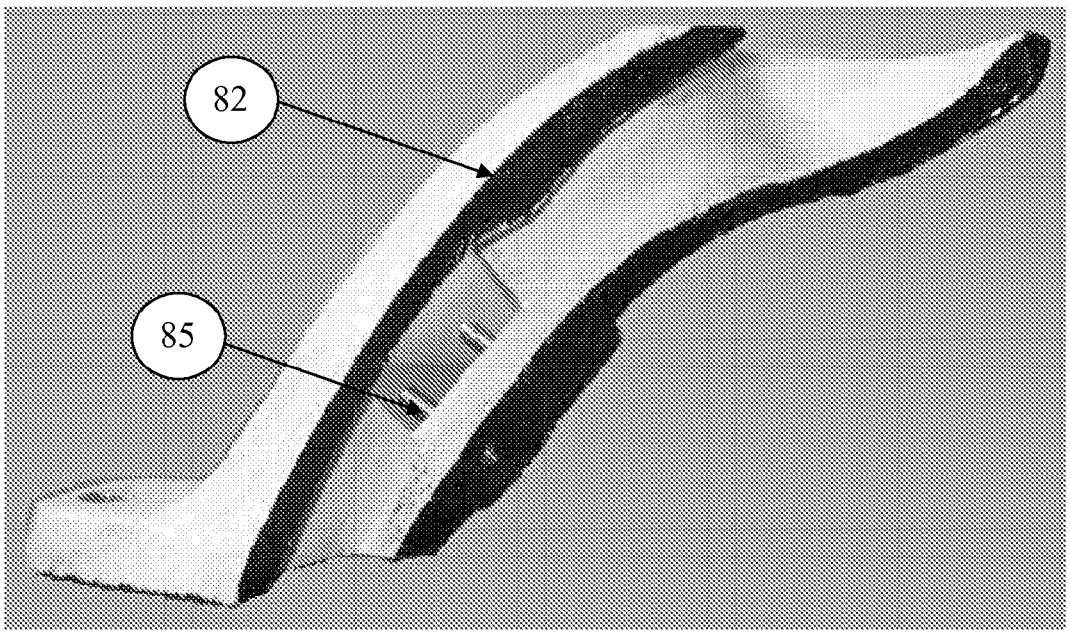
Figure 1d. Picture of the insert-holder structure with elastic inserts
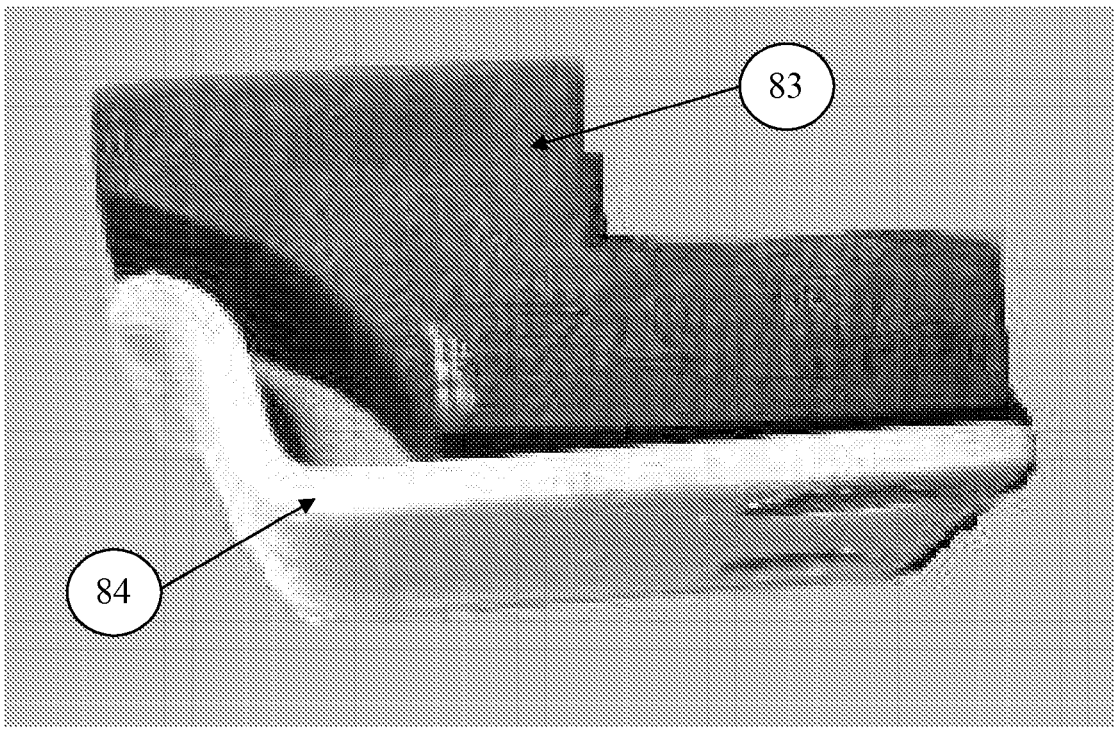

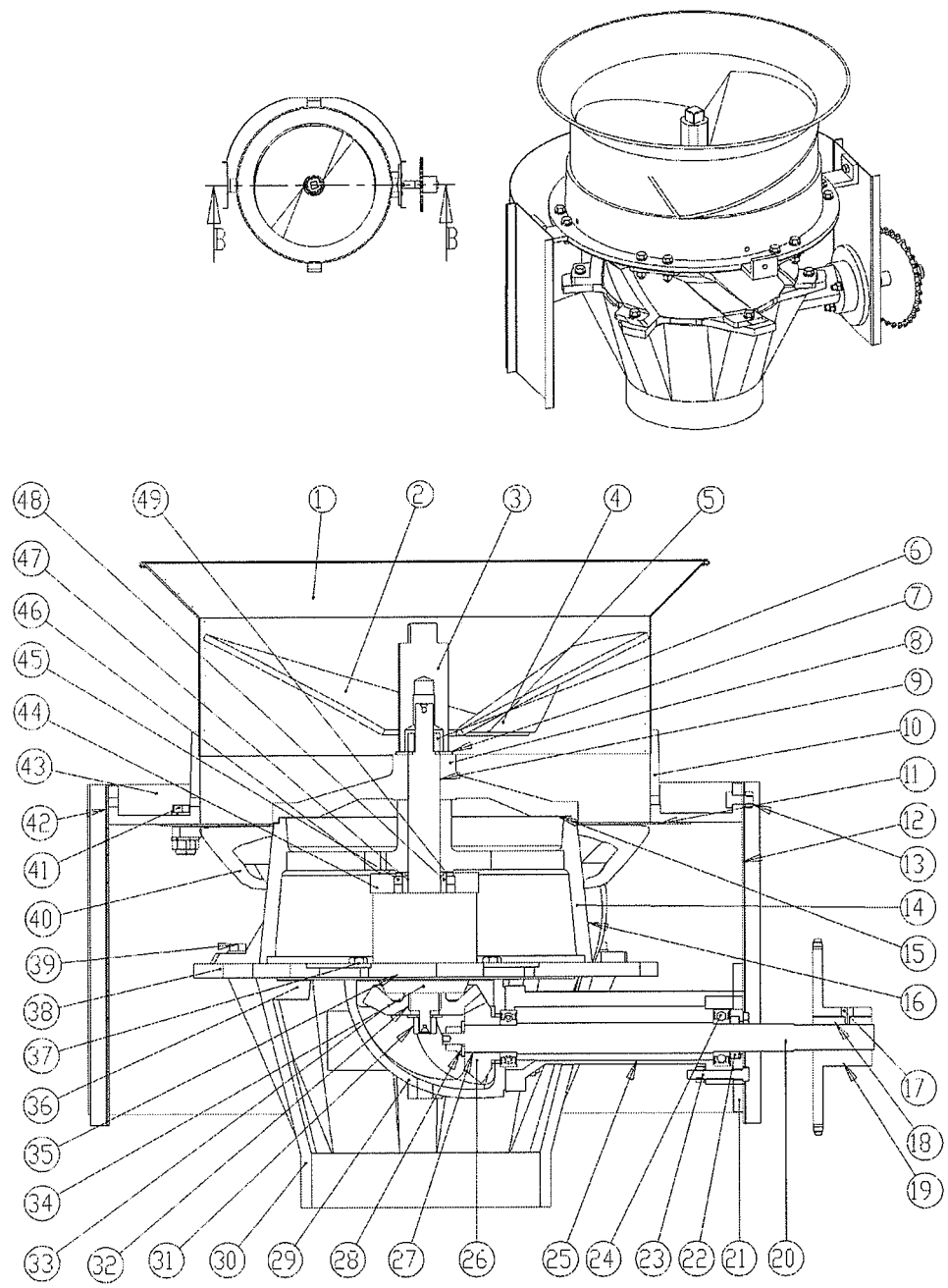
Figure 2. General and cross-sectional view of the vertical conic depulping machine with vibro-elastic helical conic aprons Figure 3a. Schematic view of the green cherries separating machine
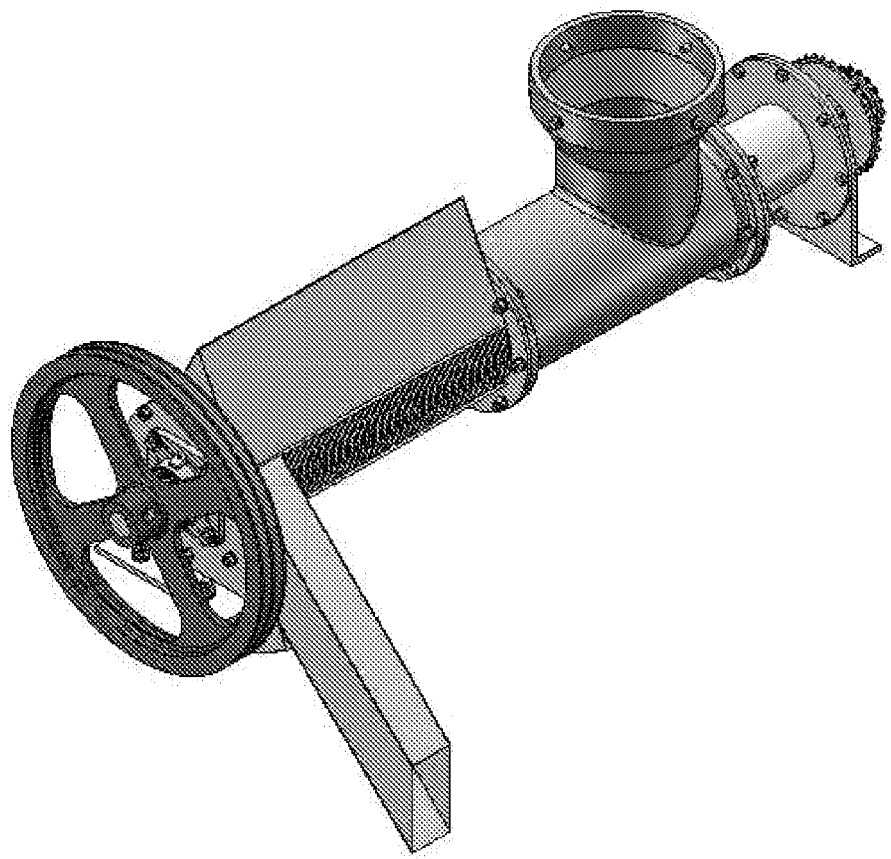
Figure 3b. Schematic view of the semicircular basket of the green cherries separating machine
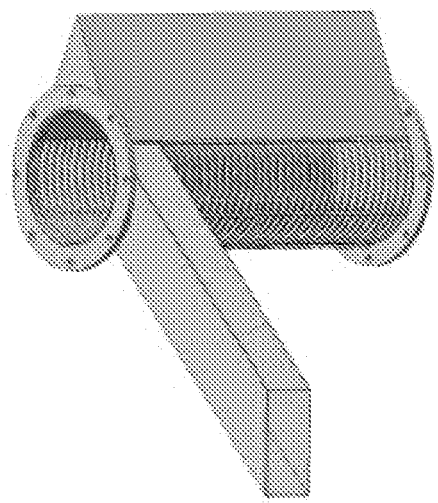

Figure 3c. Sectional schematic view of the green cherry separating machine
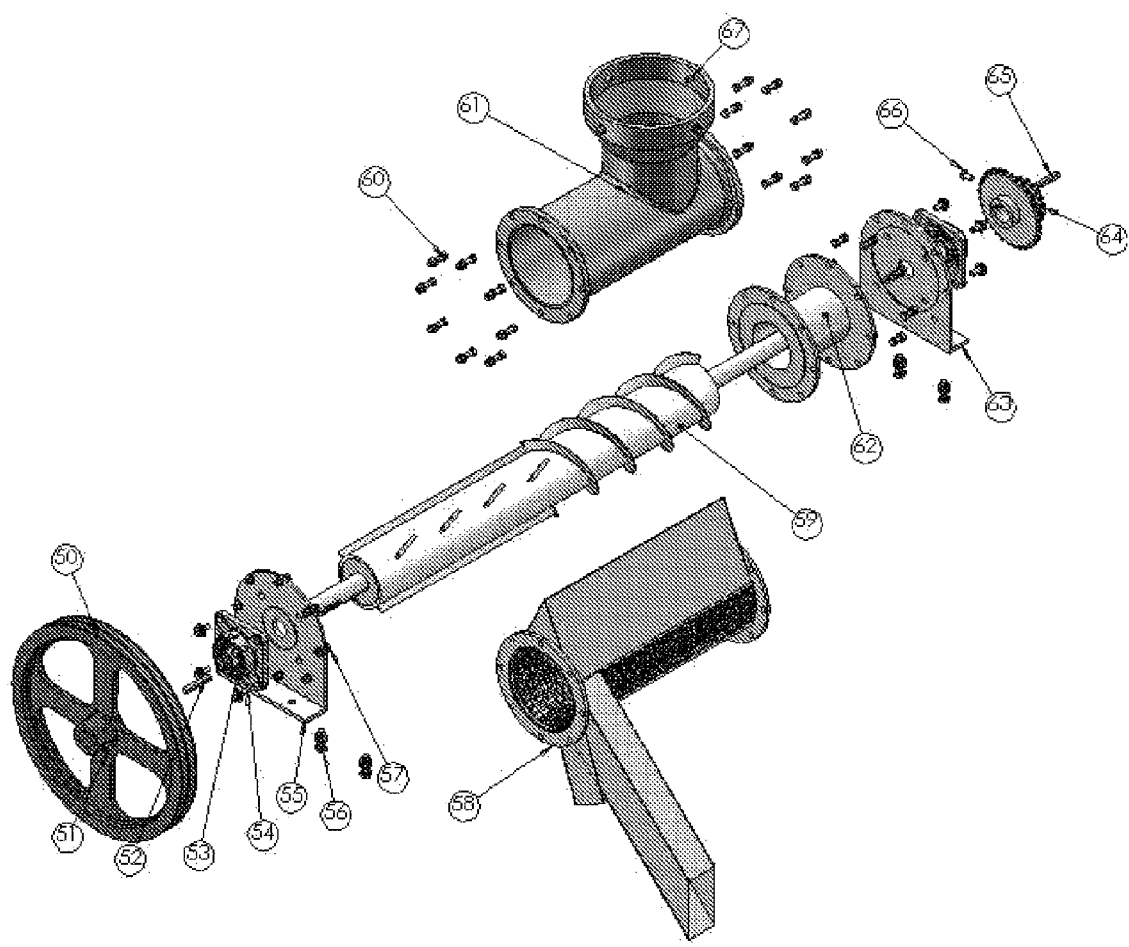

Figure 4. General View of the screw conveyor
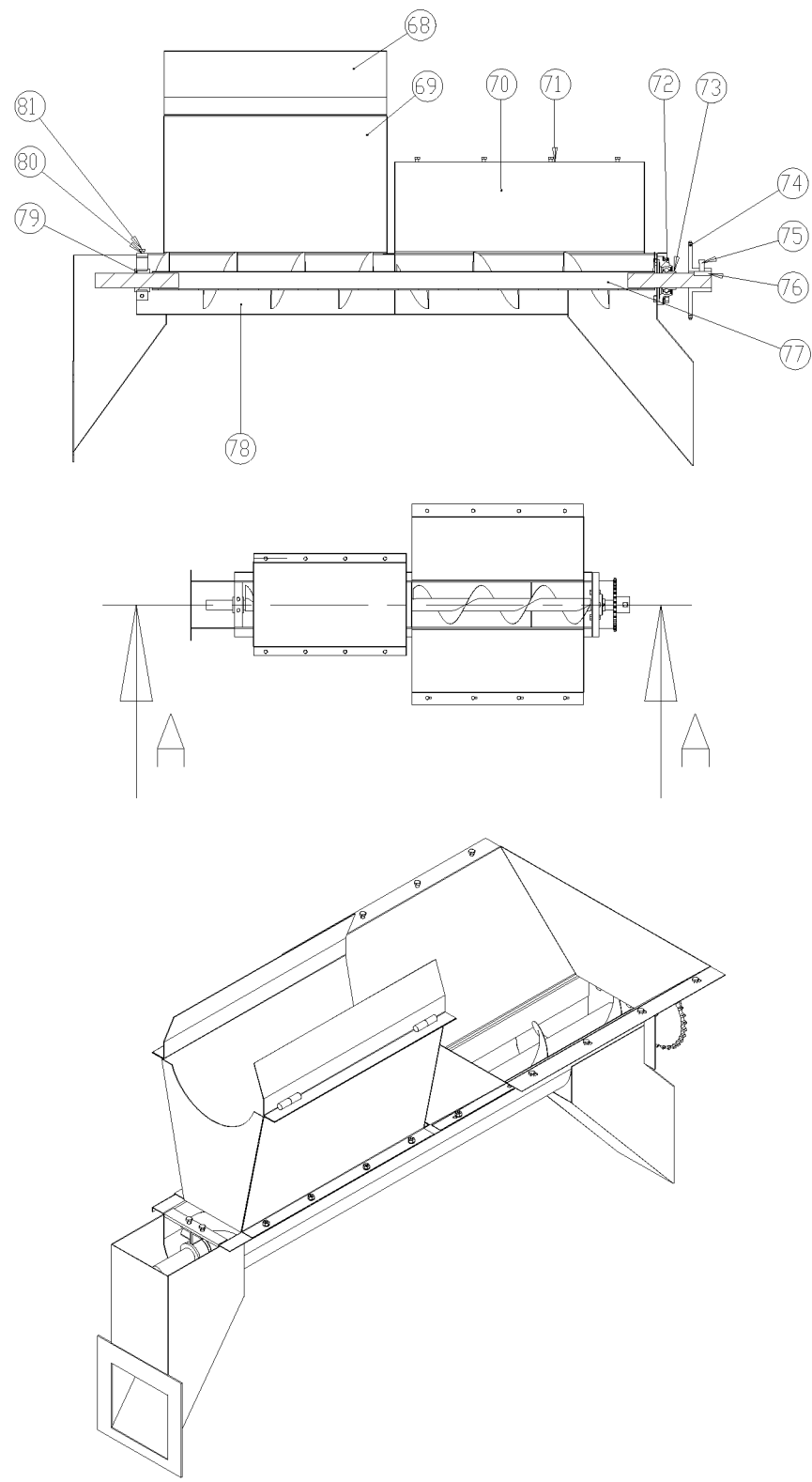

Figure 5. General assembly o fan integral machine for the selective processing of mixtures of ripe and green coffee cherries
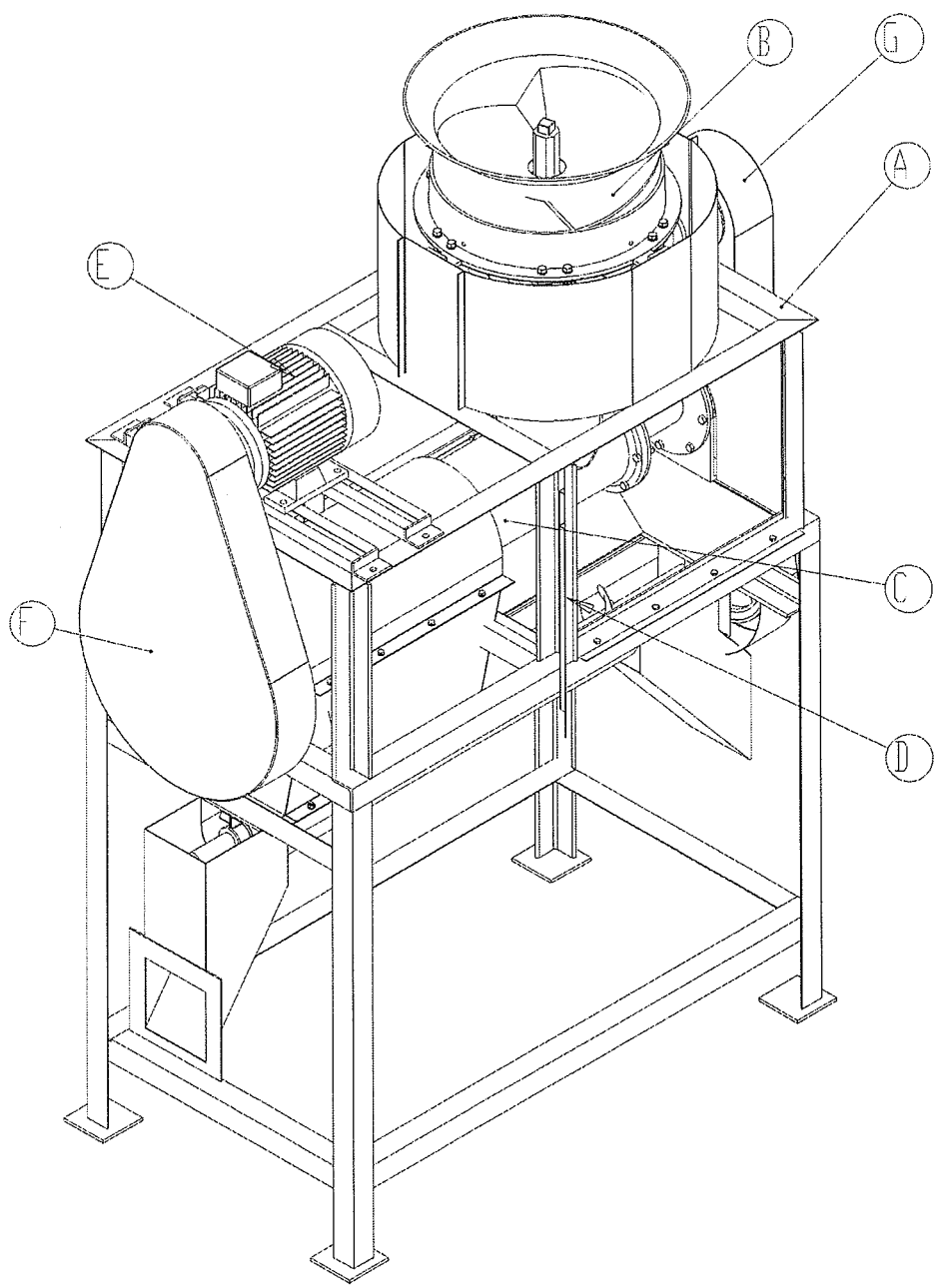

Figure 6. General view of the metallic structure
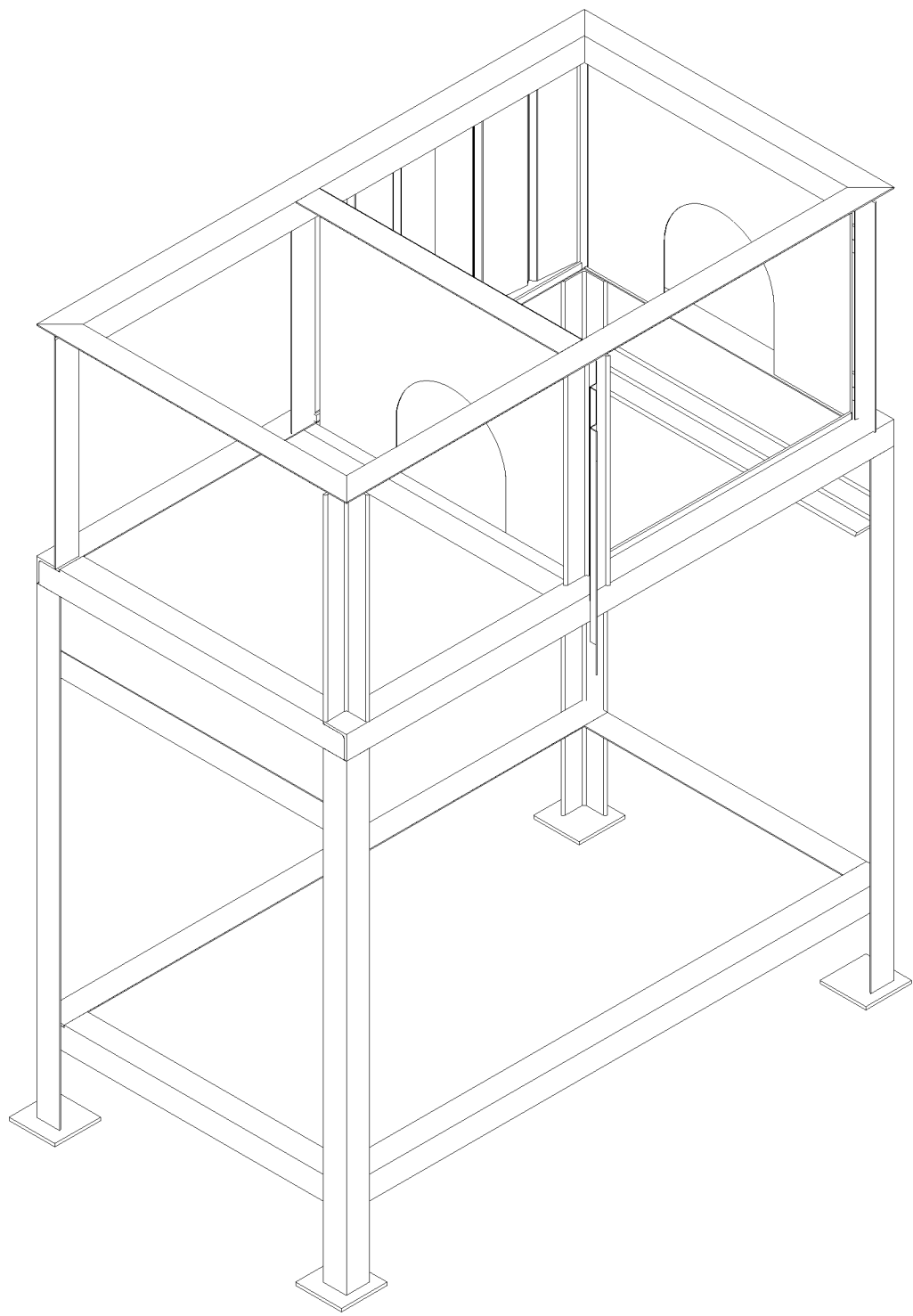

FIGURE 7. Final Artwork
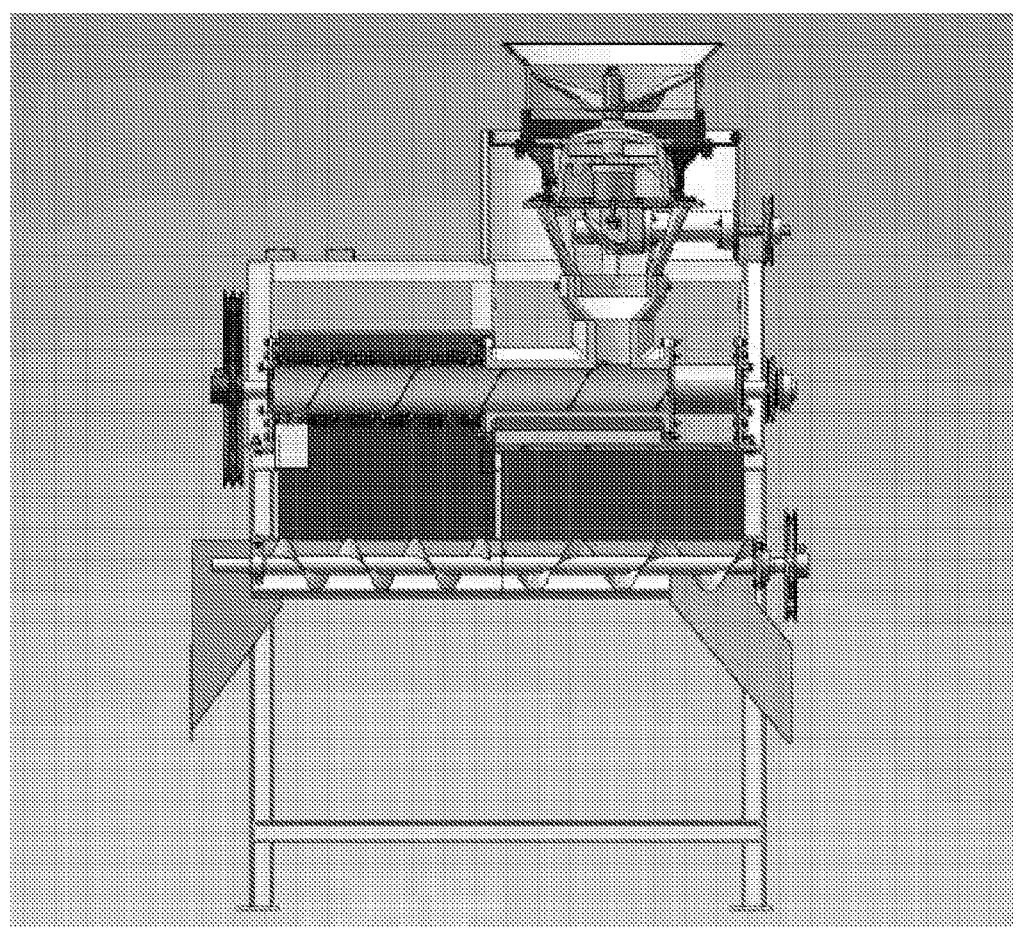

VIBRO-ELASTIC HELICAL CONIC APRONS IMPLEMENTED IN DE-PULPING MACHINES FOR THE SELECTIVE PROCESSING OF MIXTURES OF GREEN AND RIPE COFFEE CHERRIES

This application is a National Stage Application of PCT/IB2009/055555, filed 7 Dec. 2009, which claims benefit of Serial No. PI-0806014-2, filed 22 Dec. 2008 in Brazil and which applications are incorporated herein by reference. To the extent appropriate, a claim of priority is made to each of the above disclosed applications.

TECHNICAL BACKGROUND

Quality of the coffee drink depends greatly on the type of cherry processed because while ripe coffee cherries allow obtaining high quality per cup, green coffee cherries produce astringent and unpleasant flavours deteriorating quality of the drink. Therefore, it is clear to be convenient to carry out processing of ripe coffee cherries and green coffee cherries separately.

Despite the above, use of machines during harvesting of coffee cherries, as well as non selective manual harvesting of the coffee crop has evidenced an increase in the percentage of green cherries mixed with harvested ripe cherries, which unfortunately implies the need of carrying out a separation process of green and ripe coffee cherries before the processing stage, which is not simple considering, for example, that all coffee cherries have the same density, and therefore, their separation can not be made by flotation.

Different mechanisms exist at present for separating green from ripe coffee cherries. For example, electronic machines are known selecting the cherry from its colour, technology based on the use of lens and sensors for detecting bean by bean differences in colour reflection. Despite said method does not require water and power consumption is low, its application is very limited due to the high cost of equipment and low processing capacity.

Other type of mechanisms for separating mixtures of green and ripe coffee cherries known at present are directly related to the depulping process. Thus, for example, green and ripe coffee cherry separating machines have been designed which functioning principle lies on the initial compression of the mixture on walls of a perforated metallic basket, so that exerted pressure allows only breaking of pulp of ripe cherries and their subsequent passing (pulp and coffee beans in separate) through perforations of the metallic basket. In other hand, green whole cherry does not pass through perforations of the basket because of its size and hardness, and then it leaves by a side thereof.

However, performance of said equipment represents certain type of problems, among which, there are: 1) use of lot of water is required to keep perforations of the basket clear and also to regulate power consumption; 2) subsequent stage is required to separate the pulp from the beans of the ripe cherry, which is made usually by methods such as flotation or by metallic screens, and therefore, they also require high water and power consumption; 3) water contacted with the pulp and coffee mucilage becomes contaminated and its recovery implies high treatment costs; and 4) non depulped ripe cherries are mixed with green cherries, and smaller green cherries pass through perforations of the metallic basket together with the pulp and depulped ripe beans, then, subsequent processes are necessary for their recovery.

In other hand, patent document U.S. Pat. No. 3,139,919 teaches a machine designed to depulp, wash and classify coffee, involving a disk depulping machine, a coffee friction washer machine and a screen classifying coffee bean by size. This document emphasizes that said machine allows selectively depulping ripe cherries as a result of the position of disks in the depulping machine and of differences in sizes existing between ripe and green coffee cherries. However, said performance principle does not consider the existence in the crop of small ripe and green cherries, as well as the existence of big ripe and green cherries, then said system is evidently not effective to carry out an efficient selective depulping process. Additionally, depulping machine described in document U.S. Pat. No. 3,139,919 requires lot of water for its performance, and this technology is currently obsolete for evident reasons.

On the other side, at present there are known vertical depulping machines using rigid aprons, as well as horizontal cylinder depulping machines using high hardness and low elasticity rubber bottomed aprons, working together with circular screens as mechanism for separating green and ripe coffee cherries. However, due to the need of avoiding depulping of green cherries, structure and position of aprons in said machines must be calculated so that depth of the channel is higher than the size of the green cherry, which evidently leads to a high process inefficiency because small ripe cherries are also able to pass whole together with green cherries, forcing an additional process for recovering said ripe cherries.

In turn, screens are machines in form of flat tray which bottom is a slotted sheet moving laterally by cycles by and eccentric action, which causes materials of smaller size than the slots are able to pass through them, whereas remaining material (that is, of higher size) to be finally removed in separate. Unfortunately, said machines are characterized by their low process capacity, their instability and by the excessive noise they generate.

On the other side, circular screens are rotating cylinders of great size attached to a rotating shaft by metallic arms, and which are partially covered by a slotted sheet or by bars spaced each other. Said arrangement allow rotating movement of the screen to induce passing of materials of smaller size through the slots or spaces, and confining inside greater material, thereby achieving separation of materials based on their size. However, said apparatuses are not suitable either to carry out separation processes due to their excessive size and high cost.

Finally, it is very important to emphasize that the process known currently for depulping ripe coffee cherries in horizontal, vertical or disk depulping machines, is composed by four (4) fundamental stages:

1. Dosing the amount of coffee to be depulped by a rotating mechanical element;
2. Entering of cherries to the depulping zone which is formed by the dentate jacket or grate and the apron;
3. Squeezing coffee cherries between the rigid channel-shaped bottom of the apron and the dentate jacket or grate until pressure exerted surpasses breaking resistance of the pulp and make two coffee beans (formed by endosperm, tegument, endocarp and pectin layer) separate; and
4. Removing pulps from the depulping zone which are hooked in teeth of the dentate jacket or grate, and leaving of depulped beans by a different opening located at the end of the apron channel.

Form the above, it is clear that said depulping mechanism implies squeezing of coffee cherries between two rigid walls (bottom of the apron and dentate jacket or grate), then, pressure that green cherries thus processed are subjected to, is able not only to generate their depulping (favouring their mixture with ripe beans also depulped), but also to imply generation of mechanical damage in the bean. Thus, for example, it is known that depulping process made between rigid and abrasive surfaces produces a breaking of an amount equivalent to 5% and 15% parchment of green beans, and between 0.2% and 1% depulped ripe beans.

BASIC CHARACTERISTICS OF THE INVENTION

Well then, considering teachings of the previous state of the art, and based on the performance of the different types of depulping machines know so far, applicant of the present invention considered that an efficient way to carry out processing of mixtures of green and ripe coffee beans—independently from the percentage of green cherries in the mixture—, was by making fundamental changes in the structure of helical conic aprons making part of vertical coffee depulping machines, so it is possible to depulp ripe coffee beans regardless their size, separate pulp mechanically without the use of water and do not depulp green cherries, leaving them whole to facilitate their separation by size.

In this sense, and considering that compression resistance and breaking resistance of the pulp (mesocarp and pericarp) are higher for green coffee beans in relationship to ripe coffee cherries, inventor has incorporated to the body of the helical conic apron a series of elastic inserts which pliability allow them to have a displacement proportional to the size and hardness of the different types of coffee cherries, so that differential pressure exerted by said elastic inserts allow breaking the pulp of ripe cherries and just scratch the pulp of green cherries, and without causing breaking of the parchment of depulped ripe beans.

As a consequence of the above, that is, since the geometric design and location of elastic inserts in the body of the helical conic apron allow green cherries to pass along the metallic channel of the apron body without being completely depulped, subsequent separation by sizes of depulped ripe beans and of semidepulped green beans is achieved easily.

Additionally, temporary contact between each green coffee cherry fed to the depulping machine and elastic inserts located along the channel of the apron generates a brief displacement of said inserts perpendicularly to the channel trajectory, so that continuous passing of green cherries creates a repeated or vibrating movement of elastic inserts forcing all cherries,—regardless their size—, to contact the dentate jacket or grate of the depulping machine, favouring thus hooking of pulp of depulped ripe beans in teeth of the jacket, their subsequent removal from the vibro-elastic apron, and therefore, their separation from the coffee mass, being this last formed only by depulped ripe beans and semidepulped green cherries.

Well then, after said coffee mass leaves vibro-elastic aprons, it is carried to a green cherries separating machine wherein, by helixes of a rotary rotator, said mass is introduced to a semicircular basket containing suitably separated slots to allow passing of depulped ripe coffee beans, without allowing passing of semidepulped green cherries, of greater size, which are therefore separated from the final mass of the semicircular basket canasta.

Finally, coffee ripe beans passing by slots of the semicircular basket are carried by the hopper and by the protective guards of said semicircular basket to a double-threaded screw conveyor, which convey them out of the machine. In other hand, the pulp of the ripe cherry swept before by the dentate jacket or grate, is also conveyed to the screw conveyor, which carries it out of the machine through a different duct.

As seen, mentioned equipment, that is, helical conic aprons with vibro-elastic inserts, green cherries separating machine, and the integral machine comprising them, allow—without the use of water—receiving mixtures of ripe and green coffee cherries, depulping ripe cherries, separating semidepulped green cherries and separating pulp from ripe cherries, all above without damaging depulped coffee ripe beans and semidepulped green cherries.

DETAILED DESCRIPTION OF THE INVENTION

Besides what was stated before, subject matter of the present application and surprising technical advantages achieved by the inventor shall be appreciated in detail by the following description of the structure and performance of the vibro-elastic helical conic apron, of the green cherry separating machine, and of the integral machine including them, with reference to the accompanying drawings wherein:

FIG. 1a is a picture of a vibroelastic helical conic apron;
FIG. 1b is a picture of an individual elastic insert;
FIG. 1c is a picture of the apron body;
FIG. 1d is a picture of a insert-holder structure with elastic inserts;
FIG. 2 is a general and cross-sectional view of a vertical conic depulping machine with vibro-elastic helical conic aprons;
FIG. 3a is a schematic view of the green cherry separating machine;
FIG. 3b is a schematic view of the semicircular basket of the green cherry separating machine
FIG. 3c is a sectional schematic view of the green cherry separating machine;
FIG. 4 is a general view of the screw conveyor;
FIG. 5 shows the general assembly of an integral machine for the selective processing of mixtures of ripe and green coffee cherries;
FIG. 6 is a general view of the metallic structure on which the integral machine of FIG. 5 rests; and,
FIG. 7 shows a schematic diagram of the integral machine of FIG. 5.

Well then, regarding FIG. 1, the vibro-elastic helical conic apron 40 is formed by a piece in form of channel or apron body 82, elastic inserts 83 which base is snap fitted to an insert-holder structure 84, and screws 85 allowing the attachment between the apron body 82 and the insert-holder structure 84.

Said elastic inserts 83 are pieces from rubber or any other natural or synthetic flexible material, such as, for example, Teflon, nylon, urethanes, polyurethanes, polyamides and/or elastomer mixtures or any plastic material.

In other hand, both apron body 82 and insert-holder structure 84 are metallic elements or any other material which does not alter their correct performance.

Also, in other embodiment of the invention, said elastic inserts 83 may be fastened to the insert-holder structures 84 by glues, screws, vulcanization, or by any other material or process allowing to lockup their base and keep their end or tab free, so this last may displace and vibrate after contacting green and ripe coffee cherries being processed.

Additionally, in other embodiment of the invention, apron body 82 and the insert-holder structure 84 may be joined by rivets, glues, welding or by any other material or process allowing a stable fastening between these two components.

Finally, the present invention includes implementation of elastic inserts 83 inside a helical conic apron without limiting their number and size, and without being restricted to a specific arrangement or geometric shape.

Well then, regarding the physical arrangement of the integral machine for the processing of mixtures of green and ripe coffee cherries comprising vibro-elastic helical conic aprons, and with specific reference to FIG. 5, a metallic structure (A) withstands a vertical conic depulping machine (B), a green cherry separating machine (C), a pulp and depulped beans screw conveyor (D), a motor (E) and protective guards (F y G).

On the other side, regarding the functioning mechanism of the above mentioned integral machine and with reference to FIGS. 2 to 4 of the present application, mixture of green and ripe coffee cherries enters to the vertical conic depulping machine including previously described vibro-elastic helical conic aprons 40, and deposits in the hopper 1. The blade of the hopper 2 and the rotating feeder 3, form the cherry feeding regulation system to the depulping machine, so that already dosed coffee (green and ripe) passes to a second chamber formed by the framework 10 and bottom of framework 11, wherein the stirrer 8 is located, rotating at the same speed than the rotating feeder 3, and which function is distributing and press squeezing coffee cherries inside the vibro-elastic helical conic aprons 40. In said vibro-elastic aprons 40 only ripe cherries are depulped, which already separated pulp is then hooked by the dentate jacket or grate 16 mounted on the depulping cone 14, so that they both rotate jointly at the speed of a vertical shaft 34, acting as support of the depulping cone 14. Subsequently, ripe coffee beans and semi-depulped green cherries continue through the vibro-elastic apron 40, pass the star 38 and fall to the framework tube 61 of the green cherry separating machine. Once inside, rotor helixes 59 convey the coffee mass and introduce it in the semicircular basket 58, wherein a stirring process of said coffee mass is generated by blades, so that, by the movement and centrifuge force originated by the rotor 59, depulped ripe coffee beans pass through the slots of the semicircular basket 58, whereas semidepulped green cherries—because of their greater size—are kept inside the semicircular basket 58 until they are finally removed through a duct specially designed for this purpose.

Finally, ripe coffee beans passing through slots of the semicircular basket 58 are carried by the hopper 69 and by the protective guards of the semicircular basket 58 to a double-threaded screw conveyor 77 (left in an end and right in the other), which convey them out of the machine. On the other side, pulps of ripe cherry previously hooked by the dentate jacket or grate 16, are also conveyed to the screw conveyor 77, which take them out of the machine through a different duct. Rotation of said screw conveyor 77 is actuated by the chain pinion 74, whereas rotation of the vertical conic depulping machine is actuated by the chain pinion 17. However, both chain pinions 74 and 17 are actuated by the channels of the double pinion 64.

Said semicircular basket 58 may be manufactured with perforated metallic or plastic sheet or by round or square metallic rods.

This integral machine may be constructed in different sizes and capacities, and may be actuated by any type of motor, either electric or internal combustion motor.

On the other side, it is very important to emphasize that during currently known processing of coffee, green cherries are dried whole, and this fact represents high energy requirements (drying machines of higher capacity are required) and therefore, of money. However, authors of the present invention have been able to establish that physical contact during a time superior to four (4) hours between semi-depulped green cherries (that is, such as they leave the previously describe integral machine) and mucilage of depulped ripe beans allows achieving a forced ripening of said green cherries, thereby facilitating their depulping process by the integral machine of the present application, without causing physical damages in coffee beans. In this sense, removal pulp of said green cherries drastically decreases drying times and therefore, processing costs.

As a result of the above, the present application comprises a method for the selective processing of mixtures of green and ripe coffee cherries, comprising the following stages:

a. Feeding a vertical conic depulping machine comprising vibro-elastic helical conic aprons, with green and ripe coffee cherries;

b. Depulping ripe cherries and semi-depulping green cherries by passing the mixture through vibro-elastic helical conic aprons and without adding water;

c. Separating by size depulped ripe cherries from semi-depulped green cherries by a separating screen with improved rotor;

d. Collecting pulps of depulped ripe cherries hooked by the dentate jacket or grate of the vertical conic depulping machine;

e. Allowing contact of semidepulped green cherries with mucilage of depulped ripe cherries; and, f. Feeding a vertical conic depulping machine comprising vibro-elastic helical conic aprons, with semidepulped green cherries which were contacted with mucilage of depulped ripe cherries.

Finally, the present invention includes the use of vibro-elastic helical conic aprons, of green cherries separating machine and the use of the previously described integral machine, for the selective processing of mixtures of green and ripe coffee cherries.

Comparative Examples

In order to evaluate performance of vibro-elastic helical conic aprons of the present invention, testing was made on processing of mixtures of green and ripe Arabic coffee cherries (30% green cherries and 70% ripe cherries) by using a conventional green separating machine (pressure performance), and depulping machines with:

1) Helical conic aprons with metallic bottoms with different channel depths (6 mm, 7 mm y 10 mm); and, 2) Vibro-elastic helical conic aprons.

During said performance tests, following variables were evaluated:

Depulping deficiency in ripe cherry, equivalent to percent by weight in sample of non depulped ripe coffee (optimal percentage: 0%);

Efficiency of selectivity in green cherry, equivalent to percent by weight in sample of non depulped green coffee (optimal percentage: 30%);

Mechanical damage to ripe bean, equivalent to percent by weight of ripe coffee bean mass having partial loss of parchment or kernel (optimal percentage: 0%, despite Icontec Standard 2090 accepts up to 1%);

Mechanical damage to green bean, equivalent to percent by weight of green bean mass having partial loss of parchment or kernel (optimal percentage: 0%); and, Power required during the process.

Results obtained are summarized in Table 1:

TABLE 1

Results obtained Turing selective processing of mixtures of green and ripe Arabic coffee cherries (30% green cherries and 70% ripe cherries) using different machines and processes.

|  | Conventional green cherry separating machine (pressing method) | Metallic helical conic apron (channel depth: 6 mm) | Metallic helical conic apron (channel depth: 7 mm) | Metallic helical conic apron (channel depth: 10 mm) | Vibro-elastic helical conic apron |
|---|---|---|---|---|---|
| Depulping deficiency in ripe cherry | 5% | 2% | 5% | 20% | 1% |
| Efficiency of selectivity in green cherry | 25% | 3% | 10% | 20% | 27% |
| Mechanical damage to ripe bean | 0% | 1% | 0.5% | 0.2% | 0% |
| Mehcanical damage to green bean | 1% | 15% | 10% | 5% | 1% |
| Use of water | SI | NO | NO | NO | NO |
| Power Kw/ton cherry | 0.75 | 0.6 | 0.6 | 0.6 | 0.5 |

Above results show clearly that use of vibro-elastic helical conic aprons during processing of mixtures of green and ripe coffee cherries allows not only achieving an excellent selectivity during depulping process, but also radically decrease mechanical damage caused in depulped coffee beans.

Also, it is very important to emphasize that performance of the integral machine for processing mixtures of green and ripe coffee cherries according to the present invention does not requires water and power demand is low, these characteristics evidence other type of advantages achieved with respect to the performance of the conventional green cherry separating machine.

Description of Parts of the Vertical Conic Depulping Machine with Vibro-Elastic Aprons
1. Hopper: it stores cherry coffee to be depulped
2. Hopper blade: leads coffee cherry to the feeder
3. Feeder: together with adjusting fins and mooring screws form the feeding regulating system of the machine.
4. Adjusting fins
5. Mooring screws—adjusting fins with washer and nut.
6. Adjustment nut of stirrer with vertical shaft
7. adjustment washer of stirrer and vertical shaft
8. Stirrer: it is mounted on the vertical shaft on the depulping cone and distributes and press-fills coffee cherries to all helical conic aprons.
9. Dragging wedge of stirrer.
10. Framework: structure the upper part of the machine, it is mounted on helical conic aprons, it withstands the hopper and stores coffee cherries to be depulped.
11. Frameworkk bottom: steel sheet complementing the space existent between aprons and the depulping cone avoids coffee cherries to fall with pulp without being depulped.
12. Right lateral guard: together with other guards lead the pulp to the pulp screw conveyor.
13. Screws with washer and nut mooring guards of the framework.
14. Depulping cone. Cone trunk on which jacket or grate is mounted and together with helical conic aprons execute the depulping process of coffee cherries and is coupled to the vertical shaft
15. Dragging bolt of depulping cone, it ties up depulping cone with stirrer.
16. Dentate jacket or grate: steel sheet half burble-shaped teeth, due to its shape, it injures the pulp of the coffee cherry and forces it to detach from the bean to withdraw it out of helical conic aprons.
17. Chain pinion: it receives the control of the rotor of green cherry separator and transmits it to the whole machine.
18. Dragging wedge of the chain pinion
19. Prison screw of the chain pinion
20. Horizontal shaft: it is mounted on bearings in the support arm and supports the chain pinion and the conic pinion. It transmits power from the chain pinion to the conic pinion.
21. Horizontal shaft bearing cap: it contains the retainer, it retains the bearing and avoids axial displacement of the horizontal shaft.
22. Retainer: sealing avoiding oil leakages by the horizontal shaft
23. Mooring screws of the bearing cap of horizontal shaft.
24. Bearing of horizontal shaft: bearing on which horizontal shaft is mounted
25. Supporting arm of horizontal shaft: it is supported on the elbow of the drive and withstands bearing of the horizontal shaft and bearing cap.
26. Conic pinion of horizontal shaft: it transmits control and allows change in rotation sense from the horizontal shaft to the vertical shaft.
27. Dragging wedge of conic pinion of horizontal shaft
28. Mooring safety nut and washer of conic pinion to the horizontal shaft
29. Drive elbow: it withstands the supporting arm of horizontal shaft. It is supported on the star of the base and is oil reservoir to lubricate the whole drive.
30. Base: It supports the machine and rests on the Framework tube of the green cherry separating machine, it leads depulped coffee to the framework tube
31. Mooring safety nut and washer of conic pinion of vertical shaft.
32. Dragging wedge of vertical conic pinion to the vertical shaft
33. Conic pinion of vertical shaft: it receives control from the conic pinion of horizontal shaft and transmits it to the vertical shaft
34. Vertical shaft: it is mounted on bearings in the star of the base and supports the depulping cone and the conic pinion. It transmits control to the stirrer and feeder.
35. Bearings of vertical shaft: bearings on which vertical shaft is mounted.
36. Mooring studs of the star and the base
37. Studs joining the star of the base and the drive elbow.
38. Star of the base: it is supported on the base and supports transmission, depulping cone and aprons.
39. Mooring bolts of aprons to the star of the base.
40. Vibro-elastic aprons: channel-shaped metallic pieces with elastic inserts covering the area of the jacket or grate without contacting it, keeping a distance allowing the pulp to exit.
41. Hex nut screws and flat washer for mooring apron framework
42. Left lateral guard
43. Rear and front guards.
44. bearing cap of vertical shaft: it contains the retainer, it retains the bearing and avoids axial displacement of vertical shaft.
45. Retainer: sealing avoiding oil leakages by the vertical shaft.
46. Mooring screws of the bearing cap to the star.

47. Separating bushing: it is between the adjustment washer of the cone and the internal lane of superior bearing of vertical shaft.
48. O'ring: round rubber packing complementing the function of the separating bushing avoiding oil leakage through the vertical shaft.
49. Adjustment washer of depulping cone: this washer compensates tolerances in mechanisms and avoids depulping cone to chafe the star of the base.

Description of Parts of the Green Cherries Separating Machine

50. Balance: it receives control of the motor pulley and transmits it to the whole machine by bands.
51. Prison screw adjusting the wedge to the rotor shaft.
52. Dragging wedge of the balance
53. Pillow block with bearings on which rotor is mounted.
54. Screws mooring pillow blocks with the left support flange.
55. Left support flange: it withstands left pillow blocks and the semicircular basket on the structure.
56. Screws mooring flange to the structure.
57. Screws mooring semicircular basket to flange.
58. Semicircular basket: constructed with square, round rods, or perforated sheet and sheet triangular roof.
59. Rotor: tube with welded helix stages forming a screw and stage blades to form a stirrer. It has two welded shaft ends and is mounted in bearings of the pillow block.
60. Mooring screws of the semicircular basket to the framework tube.
61. Framework tube: it withstands the semicircular basket, the reel and the base of the vertical conic depulping machine and receives depulped coffee.
62. Reel: it joins the framework tube and the right support flange.
63. Right support flange: it withstands the reel and the right pillow block on the structure.
64. Double pinion: it is mounted on the end of the shaft, transmits control to the vertical conic depulping machine and to the depulped coffee and pulp screw conveyor through belts.
65. Dragging wedge of double pinion.
66. Prison screw adjusting the wedge to the rotor shaft.
67. Screws tying up vertical conic depulping machine and the green cherries separating machine.

Description of the Parts of Screw Conveyor

68. Protective guards of the semicircular basket
69. Depulped coffee Hopper carrying depulped coffee leaving the screen to the screw conveyor
70. Hopper carrying the pulp to the screw conveyor
71. Screws fastening hoppers to the structure
72. Screws fastening pillow blocks to the channel of the screw conveyor
73. Pillow block with bearing on which screw conveyor is mounted
74. Chain pinion living control to the screw conveyor
75. Prison screw fastening the dragging wedge of the chain pinion
76. Dragging wedge of the chain pinion
77. Double-threaded screw conveyor, one to the Leith, one to the right, carrying pulp by one side and depulped coffee by the other side
78. Channel of screw conveyor with two mouths, one in each end.
79. Bushing withstanding the end of the screw conveyor
80. Bushing support
81. Mooring screw of the channel support.
82. Apron body: channel-shaped metallic piece
83. Elastic insert: piece from rubber of synthetic material
84. Insert-holder structure: element fising elastic inserts
85. Screws fixing the cap to the apron Description of the General Assembly of the Machine of FIG. 5

Item A: Metallic structure wherein all elements are supported
Item B. Vertical conic depulping machine with vibro-elastic aprons
Item C: Green cherries separating machine
Item D: Pulp and depulped beans screw conveyor.
Item E: Motor
Item F: Motor guard
Item G: Depulping machine guard

The invention claimed is:

1. A vibro-elastic helical conic apron comprising:
   an apron body including a structure formed by a piece in a form of a channel;
   an insert-holder structure;
   elastic inserts fastened on their base to the insert-holder structure, said elastic inserts also comprising a free end which may displace and vibrate after contacting green and ripe coffee cherries being processed; and
   an attachment mechanism between said insert-holder structure and the apron body.

2. The vibro-elastic helical conic apron of claim 1, wherein the piece in form of a channel and the insert-holder structure are metallic.

3. The vibro-elastic helical conic apron of claim 1, wherein elastic inserts are pieces from rubber or of any other natural or synthetic flexible material.

4. The vibro-elastic helical conic apron of claim 1, wherein elastic inserts are snap fitted to the insert-holder structure or by glues, screws, vulcanization or any other material or process allowing to lock up their base and keep their end or tab free.

5. The vibro-elastic helical conic apron of claim 1, wherein insert-holder structure and apron body are joined by screws, rivets, glues, welding or by any other material or process allowing a stable fastening between these two components.

6. An integral machine for the selective processing of mixtures of green and ripe coffee cherries comprising a metallic structure withstanding a vertical conic depulping machine with vibro-elastic helical conic aprons according to claim 1, a green cherry separating machine formed by a framework tube, a rotating rotor with helixes and blades on its surface, a slotted semicircular basket allowing only passing of depulped ripe coffee beans and protective guards of said semicircular basket, a pulp and depulped beans screw conveyor, a motor and protective guards.

7. The integral machine of claim 6, wherein the motor may be electric or internal combustion motor.

8. A method for the selective processing of mixtures of green and ripe coffee cherries, comprising:
   a. Feeding the integral machine of claim 6 with mixtures of green and ripe coffee cherries;
   b. Depulping ripe cherries and semi-depulping green cherries by passing the mixture through vibro-elastic helical conic aprons and without adding water;
   c. Separating by size depulped ripe cherries from semi-depulped green cherries by the separating machine formed by a framework tube, a rotating rotor with helixes and blades on its surface, a slotted semicircular basket allowing only passing of depulped ripe coffee beans and protective guards of said semicircular basket.
   d. Collecting pulps of depulped ripe cherries hooked by the dentate jacket or grate of the vertical conic depulping machine;

e. Allowing contact of semi-depulped green fruits with mucilage of depulped ripe cherries; and, f. Feeding the integral machine of claim 6, with semi-depulped green cherries which were contacted with mucilage of depulped ripe cherries.

9. A method of using the integral machine of claim 6 for the selective processing of mixtures of green and ripe coffee cherries, the method comprising:

a) depulping ripe cherries and semi-depulping green cherries by passing the mixture through the vertical conic depulping machine according to claim 6 that includes one or more vibro-elastic helical conic aprons, each vibro-elastic helical conic apron including a structural element having a form of a channel or apron body, elastic inserts fastened on their base to an insert-holder structure, and an attachment mechanism between the insert-holder structure and the apron body; and b) separating by size depulped ripe cherries from semi-depulped green cherries with the separating machine according to claim 6.

\* \* \* \* \*